US012579675B2

(12) United States Patent　　　　　　　(10) Patent No.:　US 12,579,675 B2
Lee et al.　　　　　　　　　　　　　　　　(45) Date of Patent:　　　Mar. 17, 2026

(54) METHOD AND APPARATUS FOR APPLYING VISUAL EFFECT AND SETTING TAG TO CAPTURED IMAGE

(71) Applicant: SAMSUNG ELECTRONICS CO., LTD., Suwon-si (KR)

(72) Inventors: Youngdae Lee, Suwon-si (KR); Younggyun Lee, Suwon-si (KR); Hyeonkyoon Lim, Suwon-si (KR); Changmin Choi, Suwon-si (KR); Jeyun Hwang, Suwon-si (KR); Byunghwan Kim, Suwon-si (KR); Sejong Park, Suwon-si (KR); Jihwan Park, Suwon-si (KR); Joonhyuk Jang, Suwon-si (KR); Yonghoon Choi, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 677 days.

(21) Appl. No.: 17/983,398

(22) Filed: Nov. 9, 2022

(65) Prior Publication Data

US 2023/0066213 A1　　Mar. 2, 2023

Related U.S. Application Data

(63) Continuation of application No. PCT/KR2022/009615, filed on Jul. 4, 2022.

(30) Foreign Application Priority Data

Aug. 4, 2021　(KR) ........................ 10-2021-0102417

(51) Int. Cl.
*G06T 7/70*　　　　(2017.01)
*G06T 7/11*　　　　(2017.01)
*H04W 4/02*　　　　(2018.01)

(52) U.S. Cl.
CPC .................. *G06T 7/70* (2017.01); *G06T 7/11* (2017.01); *H04W 4/023* (2013.01)

(58) Field of Classification Search
CPC ... G06T 7/70; G06T 7/11; G06T 7/20; H04W 4/023; H04N 5/265; H04N 21/41;
(Continued)

(56) References Cited

U.S. PATENT DOCUMENTS

2009/0185763 A1　7/2009　Park et al.
2015/0138384 A1　5/2015　Kennedy et al.
(Continued)

FOREIGN PATENT DOCUMENTS

JP　　2003-274263　A　　9/2003
JP　　2005-107358　A　　4/2005
(Continued)

*Primary Examiner* — Christopher M Brandt
(74) *Attorney, Agent, or Firm* — CANTOR COLBURN LLP

(57)　　　　　　　　ABSTRACT

An electronic device includes a camera module, a communication module which detects one or more wireless communication devices located in a predetermined distance from the electronic device, and receives, from the one or more detected wireless communication devices, an identification code set in each of the one or more detected wireless communication devices, and a processor which receives a user profile from a corresponding wireless communication device of the one or more detected wireless communication devices in response to an identification code of the corresponding wireless communication device, which is retrieved from a pre-stored tag database, and applies a visual effect to an image captured by the camera module based on the received user profile.

16 Claims, 9 Drawing Sheets

(58) Field of Classification Search
CPC ...... H04N 21/431; H04N 23/60; H04N 23/80;
H04N 21/4108; H04N 21/4318
See application file for complete search history.

(56) References Cited

U.S. PATENT DOCUMENTS

| | | | |
|---|---|---|---|
| 2018/0069968 A1 | 3/2018 | Kusaka et al. | |
| 2021/0327084 A1* | 10/2021 | Ivanov ................. | G06V 20/588 |
| 2022/0201256 A1* | 6/2022 | Kappi ..................... | G01P 15/18 |

FOREIGN PATENT DOCUMENTS

| | | |
|---|---|---|
| JP | 2008-250686 A | 10/2008 |
| JP | 2017-37615 A | 2/2017 |
| JP | 2020-188507 A | 11/2020 |
| KR | 10-0744475 B1 | 8/2007 |
| KR | 10-2008-0109282 A | 12/2008 |
| KR | 10-2010-0099889 A | 9/2010 |
| KR | 10-2011-0123098 A | 11/2011 |
| KR | 10-1428582 B1 | 8/2014 |
| KR | 10-2021-0030180 A | 3/2021 |

* cited by examiner

METHOD AND APPARATUS FOR APPLYING VISUAL EFFECT AND SETTING TAG TO CAPTURED IMAGE

CROSS-REFERENCE TO RELATED APPLICATIONS

This application is a PCT-Bypass application of International Application No. PCT/KR2022/009615 designating the United States, filed on Jul. 4, 2022, which claims priority to Korean Patent Application No. 10-2021-0102417, filed on Aug. 4, 2021, and all the benefits accruing therefrom under 35 U.S.C. § 119, the content of which in its entirety is herein incorporated by reference.

BACKGROUND

1. Field

The disclosure relates to a method and an apparatus for applying a visual effect and setting a tag to an image captured in an electronic device.

2. Description of Related Art

According to a related art, electronic devices have been able to apply a same visual effect to each person identified in an image captured by a camera module. For example, it has been difficult for an electronic device to apply different visual effects to different persons identified in a captured image due to a complicated setup process for applying such different visual effects to each person. In addition, images captured by an electronic device may include people that a camera operator did not intend to capture, and unwanted people in each captured image may be manually deleted, which is inconvenient. Furthermore, face recognition is conventionally used to classify people or tag to each person included in a captured image, and classification accuracy varies depending on the performance of the face recognition.

SUMMARY

According to example embodiments of the invention, an electronic device may apply visual effects or set tags to each person in a captured image with improved accuracy by detecting wireless communication devices located nearby.

According to various example embodiments, an electronic device may include a camera module, a communication module which detects one or more wireless communication devices located in a predetermined distance from the electronic device, and receives, from the one or more detected wireless communication devices, an identification (ID) code set in each of the one or more detected wireless communication devices, and a processor which receives a user profile from a corresponding wireless communication device of the one or more detected wireless communication devices in response to an ID code of the corresponding wireless communication device, which is retrieved from a pre-stored tag database, and applies a visual effect to an image captured by the camera module using the received user profile.

In example embodiments, the communication module may establish communication with the one or more wireless communication devices based on ultra-wideband communication.

In example embodiments, the communication module may calculate a location of the one or more wireless communication devices with respect to the electronic device, and the processor may identify one or more users in the captured image, and identify a user matching each of the one or more wireless communication devices among the one or more identified users based on the calculated location of the one or more wireless communication devices.

In example embodiments, the processor may extract an object region corresponding to the one or more identified users in the captured image through object segmentation, and identify the user matching each of the one or more wireless communication devices by comparing a location of the extracted object region with the calculated location of the one or more wireless communication devices.

In example embodiments, the processor may apply a visual effect based on the user profile received from the corresponding wireless communication device to an object region corresponding to a user matching the corresponding wireless communication device in the captured image, and a visual effect applied to an object region corresponding to a user among users matching the one or more wireless communication devices in the captured image may be different from a visual effect applied to an object region corresponding to another user among the users matched to the one or more wireless communication devices.

In example embodiments, the processor may keep an object region corresponding to a user matching the one or more wireless communication devices in the captured image, and mask, based on a user input, at least some of object regions corresponding to remaining users except a user matching the one or more wireless communication devices among users identified in the captured image.

In example embodiments, the processor may generate tag information by mapping an object region corresponding to a user matching the corresponding wireless communication device to the ID code of the corresponding wireless communication device, and store the captured image combined with the generated tag information.

In example embodiments, the processor may be configured to extract, among images stored in the electronic device, an image having tag information including a candidate ID code obtained based on a user input of the electronic device, and apply a visual effect to an object region mapped to the received candidate ID code for the each extracted image.

In example embodiments, the camera module may capture a first image at a first time point in response to a capturing signal received from a first wireless communication device, and capture a second image at a second time point, which is different from the first time point, in response to a capturing signal received from a second wireless communication device, and the processor may merge the first captured image and the second captured image based on a calculated location of the one or more wireless communication devices.

In example embodiments, the processor may merge the first captured image and the second captured image based on an object region corresponding to a first user extracted from the first captured image and an object region corresponding to a second user extracted from the second captured image, where the first user may be matched to the first wireless communication device, and the second user may be matched to the first wireless communication device.

According to various example embodiments, a method performed by an electronic device includes detecting one or more wireless communication devices located in a predetermined distance from the electronic device, receiving, from the one or more detected wireless communication devices, an ID code set in each of the one or more wireless communication devices, receiving a user profile from a corresponding wireless communication device of the one or more wireless communication devices in response to an ID code of the corresponding wireless communication device, which is retrieved from a pre-stored tag database, and applying a visual effect to an image captured by a camera module of the electronic device using the user profile from the corresponding wireless communication device.

According to an example embodiment, an electronic device may detect one or more wireless communication devices located nearby or in a predetermined direction. The electronic device may apply a visual effect based on a user profile received from a wireless communication device to an object region corresponding to a user matching a corresponding wireless communication device of a captured image. The electronic device may apply a visual effect mainly applied by a user of a corresponding wireless communication device to an object region corresponding to the user in a captured image and may apply different visual effects to an object region corresponding to each user of a wireless communication device.

According to an example embodiment, an electronic device may remove an undesired person from a captured image by masking an object region corresponding to remaining users except a user matching one or more wireless communication devices detected in a captured image.

According to an example embodiment, an electronic device stores the captured image by combining it with tag information including the ID code of the wireless communication device, so that the image including the candidate user can be easily distinguished.

According to an example embodiment, an electronic device may merge images captured at different time points based on calculated locations of wireless communication devices.

BRIEF DESCRIPTION OF THE DRAWINGS

The above and other features of certain embodiments of the present disclosure will be more apparent from the following detailed description, taken in conjunction with the accompanying drawings, in which.

DETAILED DESCRIPTION

Figure 1:
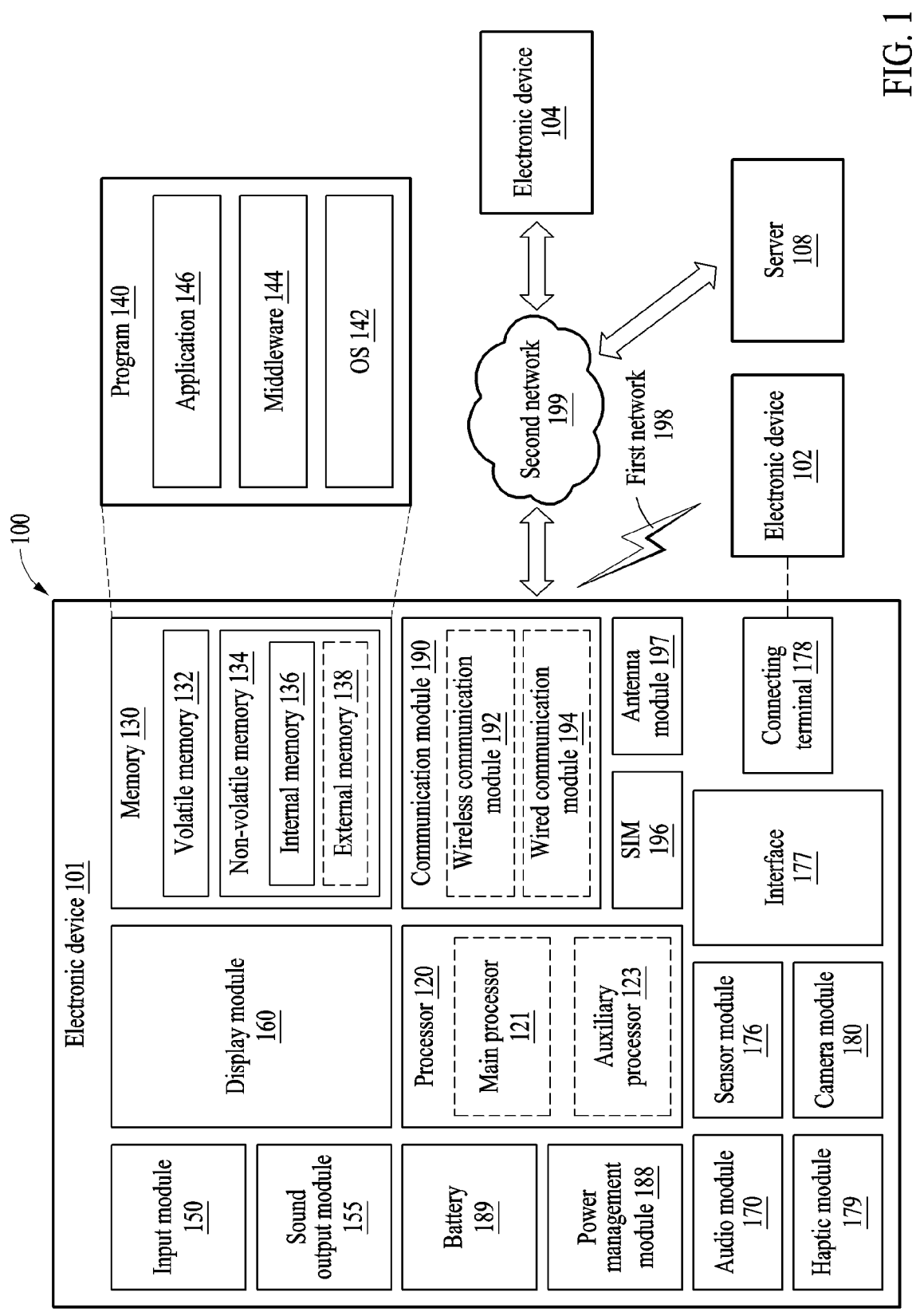
FIG. 1 is a block diagram illustrating an electronic device in a network environment according to various example embodiments.

Hereinafter, various example embodiments will be described in greater detail with reference to the accompanying drawings. When describing the example embodiments with reference to the accompanying drawings, like reference numerals refer to like elements and any repeated description related thereto will be omitted.

FIG. 1 is a block diagram illustrating an electronic device 101 in a network environment 100 according to various example embodiments. Referring to FIG. 1, in an example embodiment, the electronic device 101 in the network environment 100 may communicate with an electronic device 102 via a first network 198 (e.g., a short-range wireless communication network), or communicate with at least one selected from an external electronic device 104 and a server 108 via a second network 199 (e.g., a long-range wireless communication network). According to an example embodiment, the electronic device 101 may communicate with the external electronic device 104 via the server 108. According to an example embodiment, the electronic device 101 may include any one or any combination of a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, and an antenna module 197. In some example embodiments, at least one (e.g., the connecting terminal 178) selected from the above components may be omitted from the electronic device 101, or one or more other components may be added to the electronic device 101. In some example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another components (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. In an example embodiment, where the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) selected from the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning algorithms. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101 (e.g., a user). The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, image signal processors, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the external electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the external electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include a slit antenna, and/or an antenna including a radiating element including a conductive material or a conductive pattern disposed or formed in or on a substrate (e.g., a printed circuit board (PCB)). According to an example embodiment, the antenna module 197 may include a plurality of antennas (e.g., array antennas). In such an embodiment, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally provided or formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an example embodiment, all or some of operations to be executed by the electronic device 101 may be executed at one or more of the external electronic devices 102, 104, and 108. In an example embodiment, if the electronic device 101 is desired to perform a function or a service automatically, or in response to a request from a user or another device, the electronic device 101, instead of, or in addition to, executing the function or the service, may send a request to one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various example embodiments may be one of various types of electronic device. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be appreciated that various example embodiments of the present disclosure and the terms used therein are not intended to limit the technological features set forth herein to particular example embodiments and include various changes, equivalents, or replacements for a corresponding example embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one selected from A and B", "at least one of A or B", "A, B or C", "at least one of A, B and C", at least one selected from A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., an internal memory 136 or an external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semipermanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in a same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Figure 2:
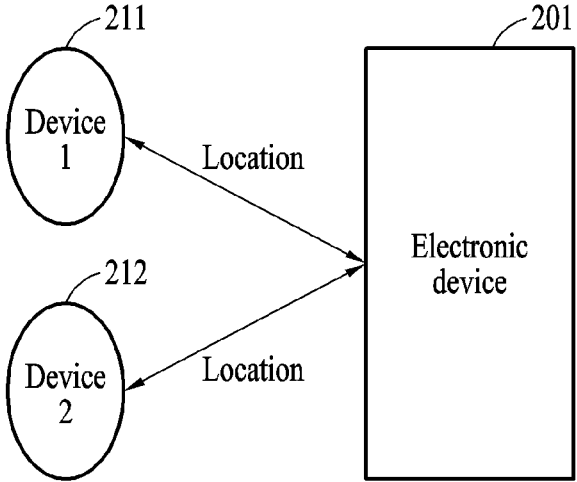
FIG. 2 is a diagram illustrating a process in which an electronic device detects one or more wireless communication devices located near the electronic device according to an example embodiment.

FIG. 2 is a diagram illustrating a process in which an electronic device detects one or more wireless communication devices located near the electronic device according to an example embodiment.

According to an example embodiment, an electronic device 201 (e.g., the electronic device 101 of FIG. 1) may detect one or more wireless communication devices 211 and 212 located nearby or within a predetermined or threshold distance. The electronic device 201 may use a communication module (e.g., the communication module 190 of FIG. 1) to detect the wireless communication devices 211 and 212 and establish wireless communication with the wireless communication devices 211 and 212.

The electronic device 201 may communicate with the wireless communication devices 211 and 212 with a predetermined band. The electronic device 201 may emit a pilot signal with the predetermined band, and the wireless communication devices 211 and 212 may send a signal in response to the pilot signal. The electronic device 201 that receives the sent signal may detect that a wireless communication device exists nearby.

The predetermined band may be 2 gigahertz (GHz) or higher. The predetermined band may be an ultra-wide band (hereinafter, "UWB"). According to an example embodiment, the communication module of the electronic device 201 may establish communication with the one or more wireless communication devices 211 and 212 based on UWB communication.

Both the electronic device 201 and a wireless communication device may include a UWB communication module. The electronic device 201 may use the UWB communication module to transmit and receive a UWB wireless signal to and from the wireless communication device. The electronic device 201 may use a signal transmission time (time of flight (TOF)) of the UWB wireless signal received via the UWB communication module to estimate a distance to each of the wireless communication devices 211 and 212. In addition, the electronic device 201 may use the UWB communication module to estimate a direction in which the wireless communication devices 211 and 212 are arranged with respect to the electronic device 201. The electronic device 201 may estimate a location of each of the wireless communication devices 211 and 212 based on the estimated distance and direction. However, example embodiments are not limited thereto, and alternatively, the electronic device may perform Bluetooth communication, ZigBee communication, and the like.

The electronic device 201 may use the UWB communication module to estimate locations of the wireless communication devices 211 and 212. The electronic device 201 may use the estimated locations of the wireless communication devices 211 and 212 to adjust a focus of a camera module (e.g., the camera module 180 of FIG. 1). In an example embodiment, the electronic device 201 may apply a blur effect to a region other than a focus region in an image captured by the camera module. The electronic device 201 may match, based on the estimated locations of the wireless communication devices 211 and 212, object regions corresponding to people identified in an image captured by a camera to the wireless communication devices 211 and 212. This is described further below. The electronic device may determine that a particular person, who is identified in the image captured by the camera and matched to a particular wireless communication device, is a user using and/or possessing the particular wireless communication device.

Figure 3:
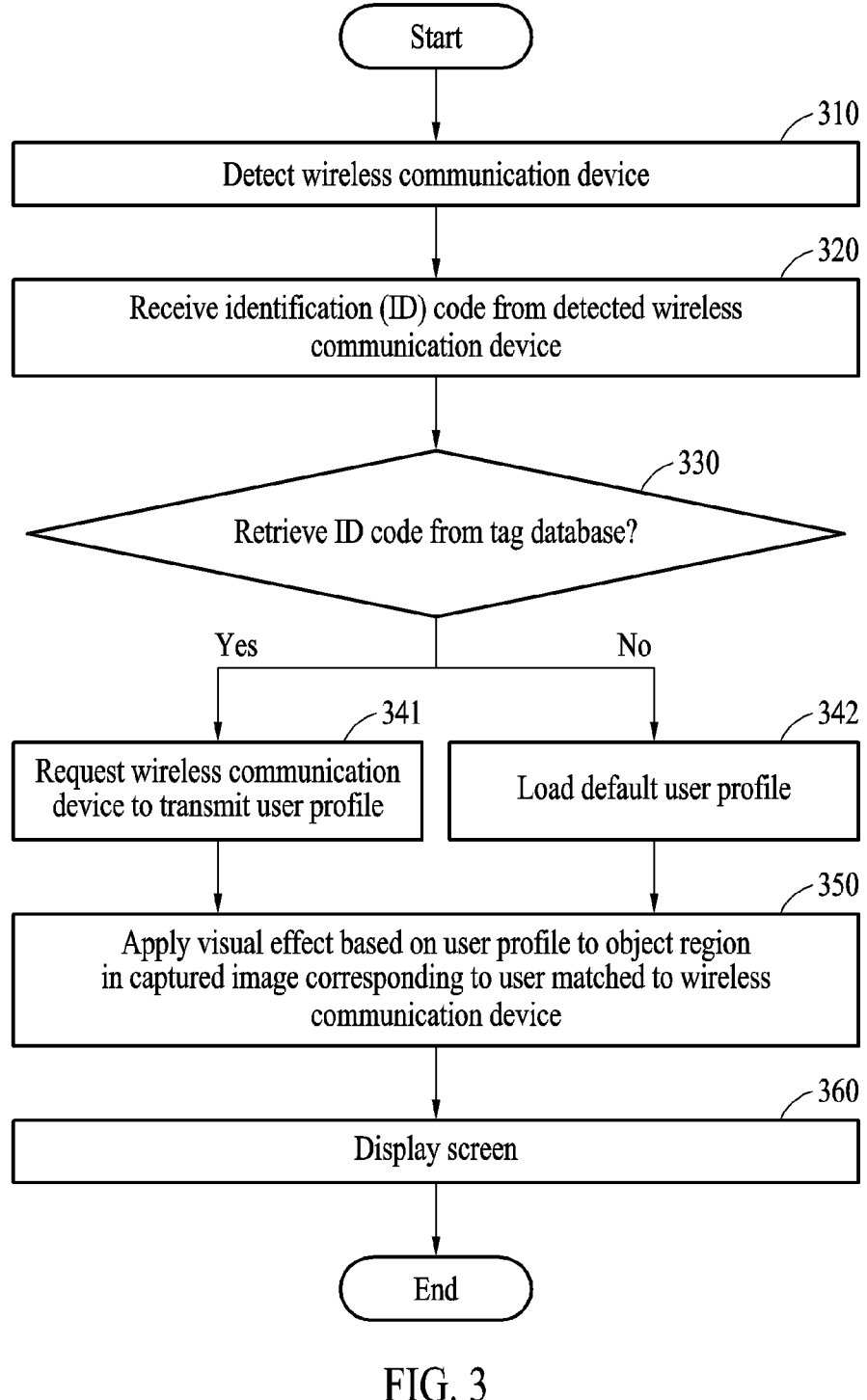
FIG. 3 is a flowchart illustrating a process in which an electronic device applies a visual effect to a captured image using a user profile received from a wireless communication device detected nearby according to an example embodiment.

FIG. 3 is a flowchart illustrating a process in which an electronic device applies a visual effect to a captured image using a user profile received from a wireless communication device detected nearby according to an example embodiment.

In operation 310, the electronic device (e.g., the electronic device 101 of FIG. 1 or the electronic device 201 of FIG. 2) may detect one or more wireless communication devices located near the electronic device. According to an example embodiment, the electronic device may detect a wireless communication device located within a predetermined or threshold distance from the electronic device. According to an alternative example embodiment, the electronic device may detect a wireless communication device located in a space corresponding to a field of view of a camera module (e.g., the camera module 180 of FIG. 1).

In operation 320, the electronic device may receive an ID code set in each of one or more detected wireless communication devices from the one or more detected wireless communication devices.

Subsequently, in operation 330, the electronic device may determine whether a received ID code of a wireless communication device is retrieved from a pre-stored tag database. The electronic device may store information on wireless communication devices in a tag database. ID codes of wireless communication devices authenticated in advance with respect to the electronic device may be stored in the tag database. In addition, the ID codes of the wireless communication devices authenticated in advance and user profiles may be mapped to each other and stored in the tag database. A user profile may include personal information and custom information. Custom information may include information, such as skin tone, a face shape, an eye color/size, and a sticker, and the like, determined based on a user's preference when correcting a captured image.

A user profile for a user of a wireless communication device may be stored in the wireless communication device in advance. According to an example embodiment, the wireless communication device may create the user profile for the user. In response to a correction made by the user of the wireless communication device in an image in which the user is captured, custom information of the user may be generated, and the user profile may be created and stored based on the generated custom information and the personal information. In an example embodiment, the wireless communication device may be a mobile device. According to an alternative example embodiment, the wireless communication device may receive a user profile from another device of the user of the corresponding wireless communication device and store the user profile received from the another device. In such an example embodiment, the wireless communication device may establish communication with the another device of the user to continuously update the user profile. In an example embodiment, the wireless communication device may be a smart tag.

According to an example embodiment, the electronic device may request a user profile from a wireless communication device which is authenticated in advance and may not request a user profile from a wireless communication device which is not authenticated in advance. In such an example embodiment, the electronic device may receive an ID code from a wireless communication device to determine whether the wireless communication device is authenticated in advance.

The electronic device may receive an ID code from a corresponding wireless communication device among the one or more detected wireless communication devices. The electronic device may search for the ID code of the corresponding wireless communication device in the pre-stored tag database. In response to the ID code of the corresponding wireless communication device being retrieved from the tag database, the electronic device may determine that the corresponding wireless communication device is authenticated in advance with respect to the electronic device. In response to the ID code of the corresponding wireless communication device not being retrieved from the tag database, the electronic device may determine that the corresponding wireless communication device is not authenticated in advance with respect to the electronic device.

In operation 341, in response to the ID code of the corresponding wireless communication device being retrieved from the tag database, the electronic device may send a request to the corresponding wireless communication device to transmit a user profile.

In response to the ID code of the corresponding wireless communication device being retrieved, the electronic device may determine that the corresponding wireless communication device is authenticated in advance with respect to the electronic device.

According to an example embodiment, the electronic device may receive a user profile for a user of a wireless communication device from a corresponding wireless communication device. In such an example embodiment, the electronic device may use the user profile received from the wireless communication device to apply a visual effect.

According to an alternative example embodiment, the electronic device may also load, from a tag database, a user profile mapped to an ID code of a corresponding wireless communication device and stored. However, since a user profile stored in the tag database is not updated, the electronic device mainly uses the user profile received from the corresponding wireless communication device. In an example embodiment, the electronic device may load the user profile stored in the tag database, if the user profile may not be received from the corresponding wireless communication device due to unstable communication with the corresponding wireless communication device. Here, the electronic device may use the user profile loaded from the tag database to apply the visual effect. In response to receiving the user profile from the corresponding wireless communication device, the electronic device may update the user profile, which is stored in the tag database, for the user of the corresponding wireless communication device.

In operation 342, in response to the ID code of the corresponding wireless communication device not being retrieved from the tag database, the electronic device may load a default user profile stored in the electronic device.

In response to the ID code of the corresponding wireless communication device not being retrieved from the tag database, the electronic device may determine that the corresponding wireless communication device is not authenticated in advance with respect to the electronic device. Here, the electronic device may load the default user profile stored in the electronic device.

In operation 350, the electronic device may apply a visual effect based on the user profile to an object region, in the image captured by the camera module, corresponding to the user matching the corresponding wireless communication device.

First, the electronic device may identify one or more users (e.g., people) in the image captured by the camera module and identify the user matching the corresponding wireless communication device among the one or more identified users.

In response to the ID code of the corresponding wireless communication device being retrieved from the tag database, the electronic device may receive the user profile from the corresponding wireless communication device and apply the visual effect based on the received user profile to the object region, in the captured image, corresponding to the user matching the corresponding wireless communication device.

In response to the ID code of the corresponding wireless communication device not being retrieved from the tag database, the electronic device may apply a visual effect based on the loaded default user profile to the object region, in the captured image, corresponding to the user matching the corresponding wireless communication device. Here, a default user profile may include information indicating at least one selected from a plurality of visual effects that the electronic device may provide to apply a basic visual effect to an object region corresponding to a user.

In an example embodiment, in response to the ID code of the corresponding wireless communication device not being retrieved from the tag database, the electronic device may determine that the corresponding wireless communication device is not authenticated in advance. As described above, the electronic device may not receive a user profile from an unauthenticated wireless communication device, and thus may apply the visual effect based on the loaded default user profile to the object region corresponding to the user matching the corresponding wireless communication device.

According to an example embodiment, the electronic device may selectively apply the visual effect based on the default user profile to an object region corresponding to a user matched to the unauthenticated wireless communication device. In an example embodiment, the electronic device may determine, based on an input from a user of the electronic device, whether to apply the visual effect indicated by the default user profile to the object region corresponding to the user matched to the unauthenticated wireless communication device and may apply only some of a plurality of visual effects indicated by the default user profile to the object region corresponding to the user.

In an example embodiment, in addition to the visual effect based on the user profile, the electronic device may apply other visual effects previously stored in the electronic device to an object region corresponding to a user matched to a wireless communication device.

In operation 360, the electronic device may display an image to which the visual effect is applied.

According to an example embodiment, the electronic device may present, in a captured image, a plurality of visual effects applicable to an object region corresponding to a user matched to a wireless communication device, based on a user profile. The electronic device may select some visual effects from the plurality of visual effects presented based on the user input and may apply the selected visual effects to the object region corresponding to the user matched to the corresponding wireless communication device. According to an alternative example embodiment, the electronic device may directly apply, without the user profile, the plurality of visual effects based on the user profile, to the object region, in the captured image, corresponding to the user matched to the wireless communication device.

In an example embodiment, in response to the visual effect based on the user profile received from the wireless communication device not being supported in the electronic device, the electronic device may apply remaining visual effects except the visual effect not being supported to the object region corresponding to the user matched to the corresponding wireless communication device. Hereinafter, a technique of matching a user (e.g., a person) identified in a captured image to a wireless communication device is described.

Figure 4:
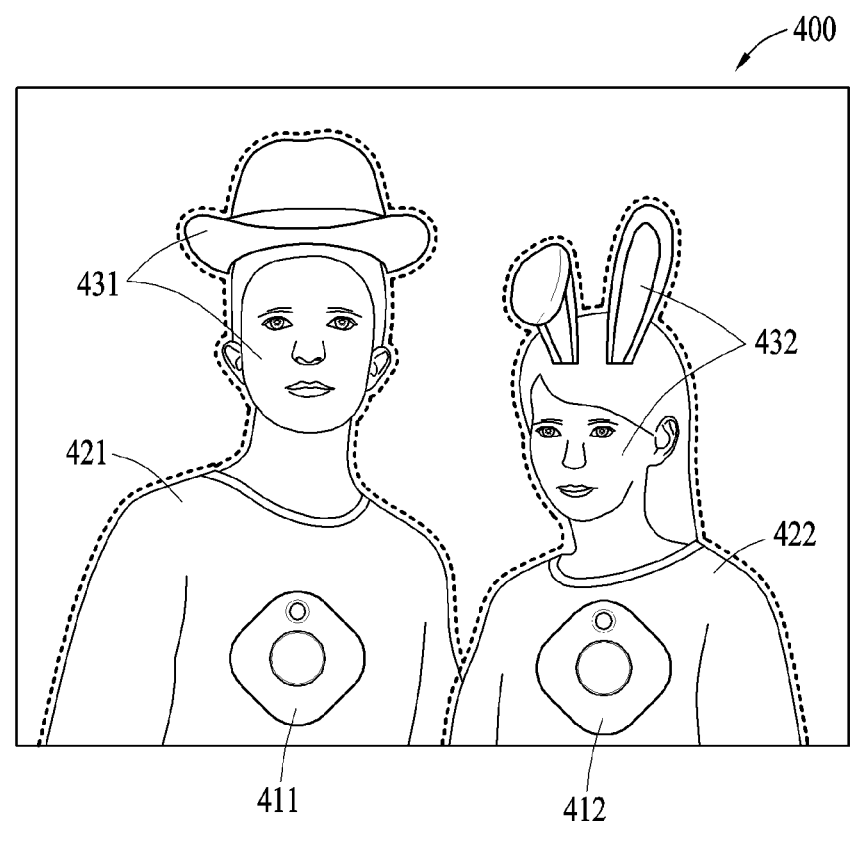
FIG. 4 is a diagram illustrating an example image displayed on an electronic device in which different visual effects are applied to an object region corresponding to each user in a captured image according to an example embodiment.

FIG. 4 is a diagram illustrating an example image displayed on an electronic device in which different visual effects are applied to an object region corresponding to each user in a captured image according to an example embodiment.

According to an example embodiment, the electronic device (e.g., the electronic device 101 of FIG. 1) may use a user profile to apply visual effects 431 and 432 to an image 400 captured by a camera module (e.g., the camera module 180 of FIG. 1).

The electronic device may match a wireless communication device and a user (e.g., a person) identified in a captured image. First, the electronic device may detect one or more wireless communication devices (e.g., 411 and 412) located near the electronic device. The electronic device may use a communication module (e.g., a UWB communication module) to calculate locations of the one or more detected wireless communication devices (e.g., 411 and 412) with respect to the electronic device.

The electronic device may identify one or more users in the captured image 400. The electronic device may identify, based on the locations of the one or more detected wireless communication devices (e.g., 411 and 412), a user matched to each of the one or more detected wireless communication devices (e.g., 411 and 412) among the one or more identified users in the captured image 400.

In an example embodiment, the electronic device may extract object regions (e.g., 421 and 422) corresponding to one or more users from the captured image 400 through object segmentation. The electronic device may compare locations of the object regions (e.g., 421 and 422), in the captured image 400, corresponding to the one or more users extracted from the captured image 400 with the calculated locations of the one or more wireless communication devices (e.g., 411 and 412). The electronic device may identify the user matched to each of the one or more wireless communication devices (e.g., 411 and 412) based on a result of the comparison.

In an example embodiment, the electronic device may identify a first user corresponding to a first object region 421 and identify a second user corresponding to a second object region 422 in the captured image 400. As many wireless communication device users carry their wireless communication devices close to their body, a location of a wireless communication device user and a calculated location of the wireless communication device may be close to each other. The electronic device may convert a calculated three-dimensional location of the wireless communication device into a two-dimensional location based on a field of view of a camera. The electronic device may compare and match the converted two-dimensional location of the wireless communication device and the location of the object region corresponding to the user identified in the captured image. However, example embodiments are not limited thereto, and a wireless communication device and a user may match in various ways. The electronic device may determine that the first user corresponding to the first object region 421 and a first wireless communication device 411 match each other and that the second user corresponding to the second object region 422 and a second wireless communication device 412 match each other. The electronic device may determine that a user of the first wireless communication device 411 is the first user and that a user of the second wireless communication device 412 is the second user.

The electronic device may receive a user profile from the wireless communication device and use the received user profile to apply a visual effect to an image captured by the camera module.

According to an example embodiment, the electronic device may apply a visual effect based on a user profile received from a corresponding wireless communication device among the one or more detected wireless communication devices to an object region, in the captured image, corresponding to a user of the corresponding wireless communication device. The visual effect applied to the object region corresponding to the user among the wireless communication device users identified in the captured image and a visual effect applied to an object region corresponding to another user among the identified wireless communication device users may be different.

The electronic device may separately apply a visual effect to each of the object regions (e.g., 421 and 422), in the captured image 400, corresponding to the users matched to the one or more wireless communication devices (e.g., 411 and 412). The electronic device may receive an ID code from each of the one or more detected wireless communication devices (e.g., 411 and 412). In a case where all ID codes of the wireless communication devices (e.g., 411 and 412) are retrieved from a stored tag database, the electronic device may send a request to each of the wireless communication devices (e.g., 411 and 412) to transmit a user profile. The electronic device may receive a user profile of the first user from the first wireless communication device 411 and receive a user profile of the second user from the second wireless communication device 412. The electronic device may apply a visual effect to the object region 421, in the captured image 400, corresponding to the first user matched to the first wireless communication device 411 independently of the object region 422 corresponding to the second user. In addition, the electronic device may apply a visual effect to the object region 422, in the captured image 400, corresponding to the second user matched to the second wireless communication device 412 independently of the first object region 421. The electronic device may use the user profile to apply the visual effects 431 and 432 to the image 400 captured by the camera module. The electronic device may present, in the captured image 400, a plurality of visual effects applicable to the object region 421 corresponding to the first user of the first wireless communication device 411 based on the user profile of the first user. In an example embodiment, the electronic device may add a hat sticker to the object region 421 corresponding to the first user based on the user profile of the first user and apply a visual effect that corrects skin tone to one that the first user prefers. Similarly, the electronic device may present, in the captured image 400, a plurality of visual effects applicable to the object region 422 corresponding to the second user of the second wireless communication device 412 based on the user profile of the second user. In an example embodiment, the electronic device may add a rabbit sticker to the object region 422 corresponding to the second user based on the user profile of the second user and apply a visual effect that corrects skin tone to one that the second user prefers. In response to an ID code of the first wireless communication device 411 not being retrieved from the stored tag database, the electronic device may use a default profile to apply the visual effect to the object region 421 corresponding to the first user. Similarly, in response to an ID code of the second wireless communication device 412 not being retrieved from the stored tag database, the electronic device may use the default profile to apply the visual effect to the object region 422 corresponding to the second user.

In an example embodiment, the electronic device may receive a user profile from a wireless communication device even if an ID code of the corresponding wireless communication device is not retrieved from the tag database. In such an embodiment, in response to the ID code of the corresponding wireless communication device not being retrieved from the tag database, the electronic device may determine that the corresponding communication device is not authenticated in advance. In an example embodiment, after receiving the ID code from the corresponding wireless communication device, the electronic device may perform authentication for the corresponding wireless communication device, and thus may receive the user profile from the corresponding wireless communication device. The electronic device may map and store the ID code of the wireless communication device in the tag database and the received user profile. In an example embodiment, the electronic device may remove an existing visual effect applied to the object region corresponding to the user matched to the wireless communication device and newly apply a visual effect based on the user profile received from the wireless communication device. In an example embodiment, when the electronic device receives the user profile from the wireless communication device the electronic device may apply the visual effect based on the received user profile to the object region of the user by performing authentication.

In an example embodiment, as described above, the electronic device may separately apply a visual effect to each object region corresponding to the user identified in the image 400 captured by the camera module.

Figure 5:
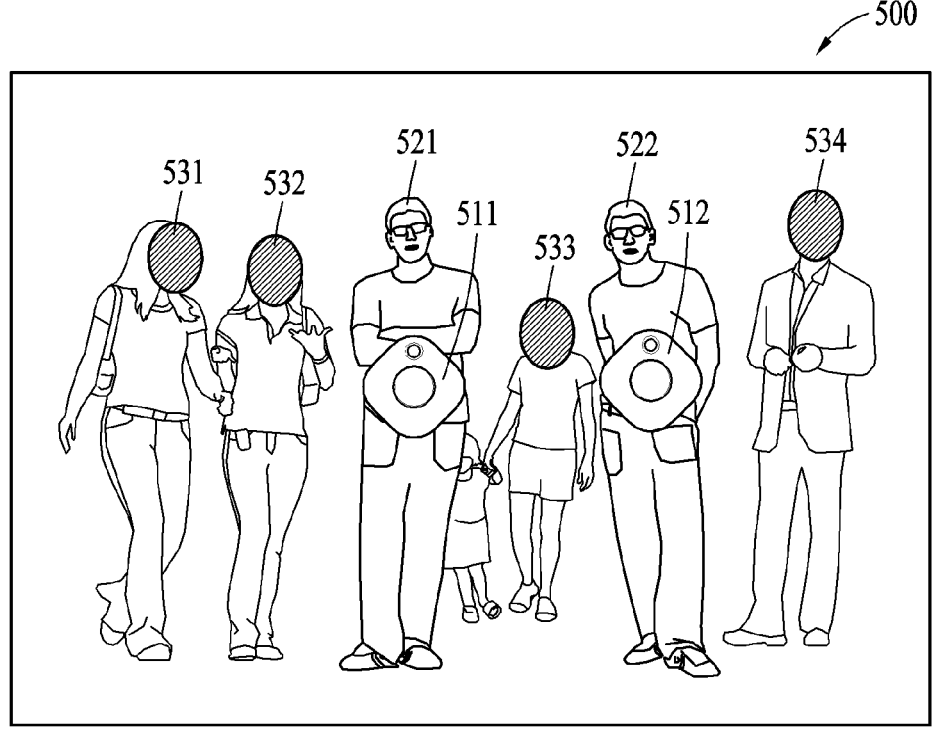
FIG. 5 is a diagram illustrating an example image displayed on an electronic device on which an object region corresponding to remaining users except a user matching a wireless communication device is masked in a captured image according to an example embodiment.

FIG. 5 is a diagram illustrating an example image displayed on an electronic device in which an object region corresponding to remaining users except a user matching a wireless communication device is masked in a captured image according to an example embodiment.

According to an example embodiment, the electronic device may detect one or more wireless communication devices 511 and 512 located near the electronic device. The electronic device may identify one or more users (e.g., people) from an image 500 captured by a camera module through object segmentation. The electronic device may extract object regions (e.g., 521, 522, 531, 532, 533, and 534) corresponding to the one or more users identified in the captured image 500.

The electronic device may keep object areas 521 and 522 corresponding to users matching the detected one or more wireless communication devices 511 and 512 among the users identified in the captured image 500. In addition, the electronic device may mask, based on a user input, at least some of object regions 531, 532, 533, and 534 corresponding to remaining users except the users matching the one or more wireless communication devices 511 and 512 among the one or more users identified in the captured image 500. In an example embodiment, the electronic device may mask, based on the user input, regions indicating faces among the object regions 531, 532, 533, and 534 corresponding to the remaining users. Furthermore, the electronic device may reconstruct the masked regions based on pixel values of surrounding regions adjacent to the masked regions. In an example embodiment, the electronic device may perform an image inpainting process on the masked regions to replace the masked regions with ones that are coherent with the surrounding regions.

Figure 6:
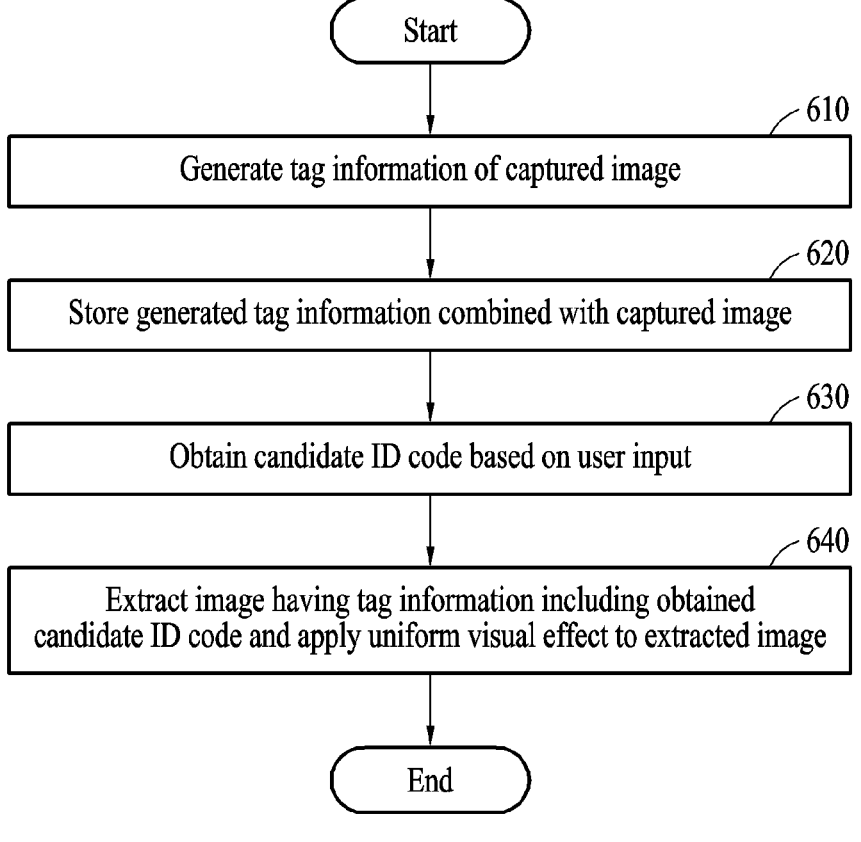
FIG. 6 is a flowchart illustrating a process in which an electronic device stores a captured image combined with tag information according to an example embodiment.

FIG. 6 is a flowchart illustrating a process in which an electronic device stores a captured image combined with tag information according to an example embodiment.

In operation 610, the electronic device (e.g., the electronic device 101 of FIG. 1) may generate tag information corresponding to a captured image. The tag information including information on one or more users identified in the captured image may be combined with the captured image.

The electronic device may generate the tag information by mapping, to an ID code of a corresponding wireless communication device, an object region corresponding to a user matched to the corresponding wireless communication device among one or more wireless communication devices identified in the captured image. Referring to FIG. 4, in the captured image 400, the electronic device may generate tag information on the captured image 400 by mapping the ID code of the first wireless communication device 411 and the object region 421 corresponding to the first user matched to the first wireless communication device 411 and mapping the ID code of the second wireless communication device 412 to the object region 422 corresponding to the second user matched to the second wireless communication device 412.

Subsequently, in operation 620, the electronic device may store the generated tag information combined with the captured image. The electronic device may use tag information combined with an image including a particular user to search for the image among images stored in the electronic device.

In operation 630, the electronic device may obtain a candidate ID code based on a user input. According to an example embodiment, the electronic device may directly receive the candidate ID code from a user. According to an alternative example embodiment, the electronic device may receive an input indicating a candidate user corresponding to the candidate ID code from the user. The candidate ID code may indicate an ID code set in a wireless communication device of the candidate user. The electronic device may obtain the candidate ID code by extracting the ID code of the wireless communication device corresponding to the candidate user from a stored tag database.

In operation 640, the electronic device may extract an image having tag information including the obtained candidate ID code from stored images and uniformly apply a visual effect to an object region mapped to the candidate ID code in every extracted image.

The electronic device may filter the stored images based on the obtained candidate ID code. The electronic device may identify combined tag information from each of the stored images and determine whether a candidate ID code exists in the identified tag information. The electronic device may extract an image combined with tag information having a candidate ID code from the stored images.

The electronic device may use the tag information to share the filtered image with another electronic device. First, the electronic device may extract the image having the tag information including the candidate ID code from the images stored in the electronic device to extract an image including the candidate user. In an example embodiment, the extracted image may be one or more images. The electronic device may transmit an image selected by the user among the extracted images to another electronic device.

In an example embodiment, the electronic device may extract the image having the tag information including the candidate ID code and uniformly apply the visual effect to the object region mapped to the candidate ID code for the each extracted image. The tag information combined with the image includes information on an object region mapped to a candidate ID code in a corresponding image. The electronic device may apply a visual effect preferred by the candidate user to an object region corresponding to the candidate user in each image including the candidate user.

According to an example embodiment, the electronic device may uniformly apply the visual effect selected or preferred by the candidate user to the object region corresponding to the candidate user for each image of all images including the candidate user. According to an alternative example embodiment, the electronic device may extract the images including the candidate user based on the candidate ID code and apply the visual effect selected or preferred by the candidate user to the object region corresponding to the candidate user for only some images selected by the user from among the extracted images including the candidate user.

According to an example embodiment, establishing communication with the wireless communication device having the candidate ID code, the electronic device may uniformly apply the visual effect to the object region corresponding to the candidate user by receiving a user profile of the candidate user from the corresponding wireless communication device. In an example embodiment, the electronic device may apply the visual effect based on the user profile of the candidate user to each object region corresponding to the candidate user. According to an alternative example embodiment, in response to not establishing the communication with the wireless communication device having the candidate ID code, the electronic device may uniformly apply the visual effect to the object region corresponding to the candidate user by loading the user profile of the candidate user stored in the tag database.

Figure 7:
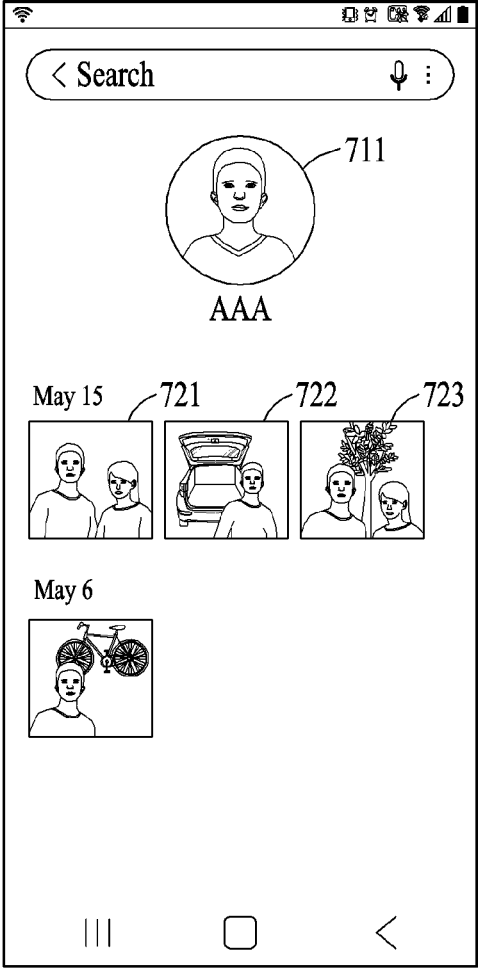
FIG. 7 is a diagram illustrating an example image displayed on an electronic device generated by extracting an image having tag information including a candidate identification (ID) code obtained based on a user input according to an example embodiment.

FIG. 7 is a diagram illustrating an example image displayed on an electronic device generated by extracting an image having tag information including a candidate ID code obtained based on a user input according to an example embodiment.

The electronic device may generate tag information corresponding to a captured image and store the captured image combined with the generated tag information. Thereafter, the electronic device may filter images including a candidate user based on a user input in stored images. The electronic device may obtain a candidate ID code based on the user input. The electronic device may display, on a display, a graphic representation 711 indicating a candidate user corresponding to the obtained candidate ID code. The electronic device may extract images 721, 722, and 723 having tag information including a candidate ID code corresponding to the candidate user from the stored images. The electronic device may uniformly apply the visual effect based on the user profile of the candidate user to each object region mapped to the received candidate ID code in each of the extracted images 721, 722, and 723. In an exemplary embodiment, the electronic device may uniformly apply the visual effect to all of the extracted images or to some images selected by the user from among the extracted images.

Figure 8:
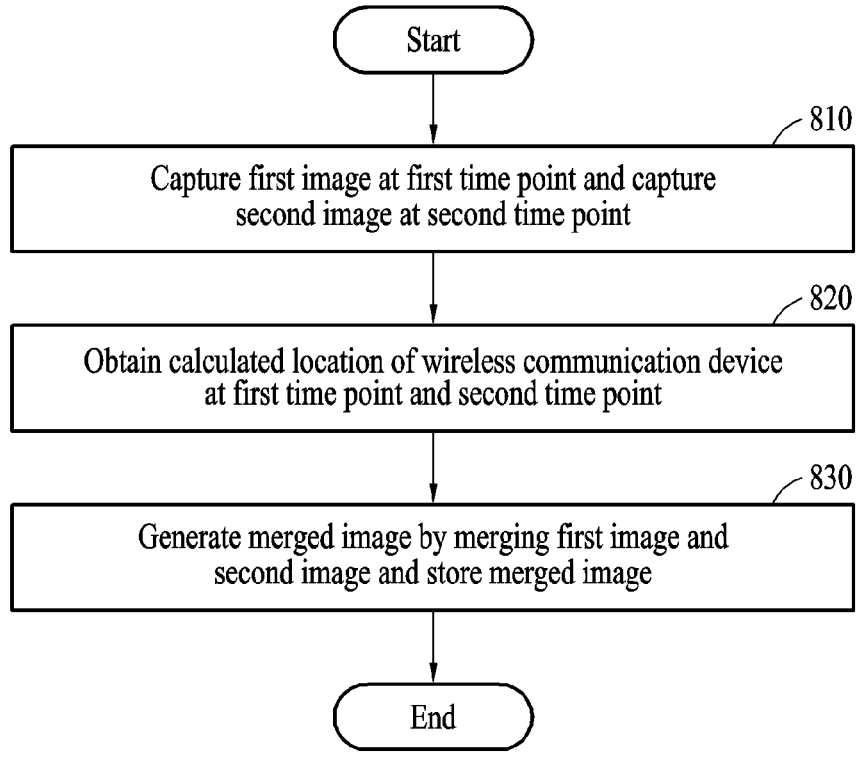
FIG. 8 is a flowchart illustrating a process in which an electronic device merges images captured at a plurality of time points based on a calculated location of a wireless communication device.

FIG. 8 is a flowchart illustrating a process in which an electronic device merges images captured at a plurality of time points based on a calculated location of a wireless communication device.

The electronic device may capture an image including a plurality of users, and each of the plurality of users may desire to be captured at a time point different from each other. The electronic device may generate an image selected or preferred by all of the plurality of users by merging images captured at each time point desired by each of the plurality of users included in the image. Hereinafter, for convenience of description an example embodiment where the electronic device captures an image including two users. However, example embodiments are not limited thereto, and the electronic device may capture an image including three or more users and merge a plurality of images captured at a time point desired by each of a plurality of users included in an image.

In operation 810, a camera module of the electronic device (e.g., the electronic device 101 of FIG. 1) may capture a first image at a first time point and capture a second image at a second time point. According to an example embodiment, the electronic device may receive a capturing time point from a wireless communication device among one or more detected wireless communication devices located nearby. The electronic device may capture the first image at the first time point based on a capturing signal received from a first wireless communication device and capture the second image at the second time point based on a capturing signal received from a second wireless communication device.

In operation 820, the electronic device may obtain a calculated location of the one or more wireless communication devices detected near the electronic device at the first time point when the first image is captured. The electronic device may obtain a calculated location of the one or more wireless communication devices detected near the electronic device at the second time point when the second image is captured.

The electronic device may extract, at the first time point, an object region corresponding to the first user matched to the first wireless communication device from the first image based on calculated locations of wireless communication devices. Similarly, the electronic device may extract, at the second time point, an object region corresponding to the second user matched to the second wireless communication device from the second image based on the calculated locations of the wireless communication devices. The electronic device may merge the first image and the second image based on the object region corresponding to the first user extracted from the first image and the object region corresponding to the second user extracted from the second image.

In operation 830, the electronic device may generate a merged image by merging the first image and the second image and store the merged image. The electronic device may merge the first image and the second image considering a location of the object region corresponding to the first user in the first image and a location of the object region corresponding to the second user in the second image. Supposing the first image and the second image are merged, in general, an image on which a merger of images shall be based may be selected based on an intensity set in each of the images to fuse boundary regions where the first image and the second image merge. In an example embodiment, color information of a boundary region may be determined based on a selected image. The electronic device may generate a merged image in which the first image and the second image are merged and store the generated merged image.

Figure 9:
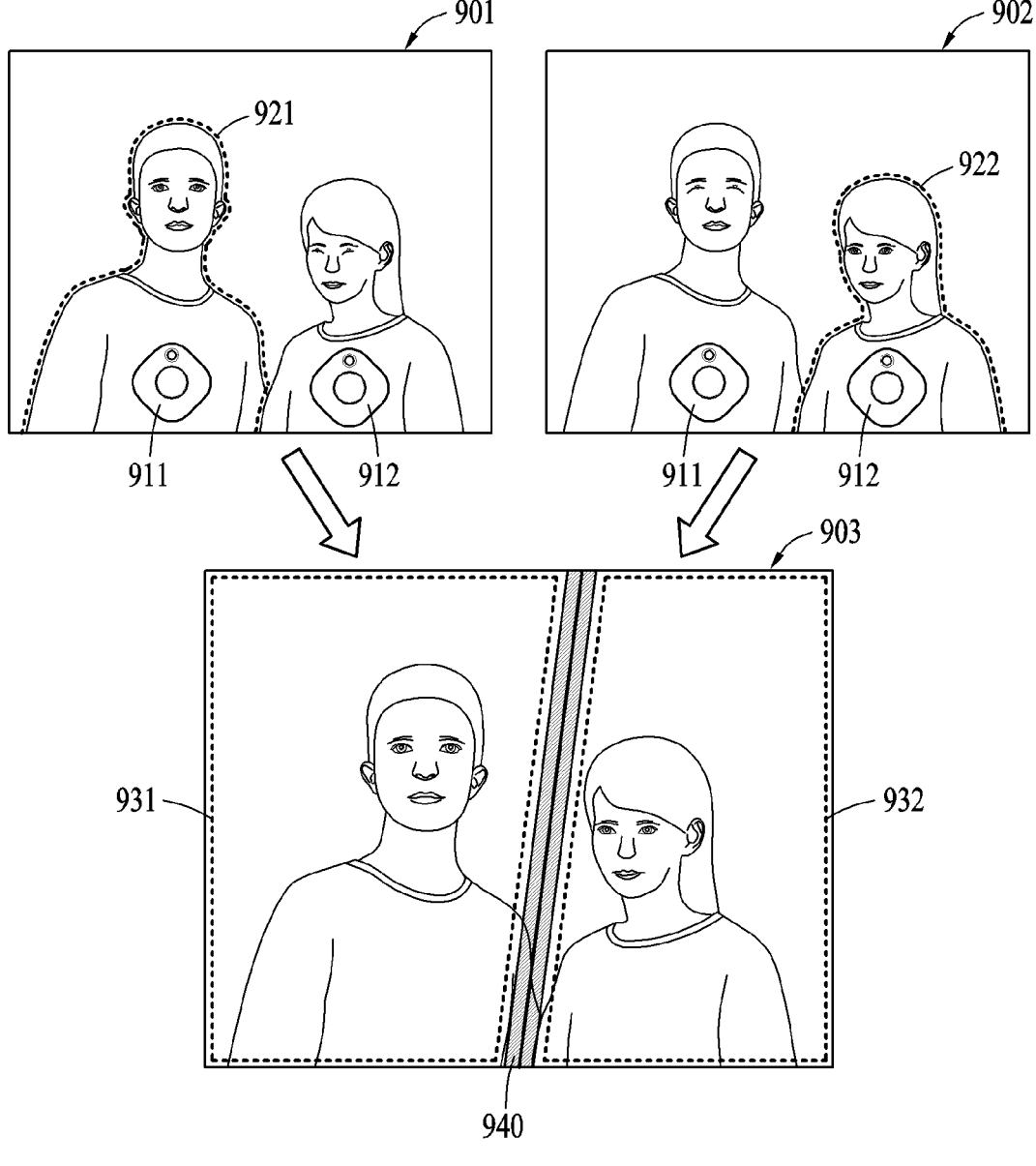
FIG. 9 is a diagram illustrating an example image displayed on an electronic device generated by merging a plurality of images captured at a plurality of time points.

FIG. 9 is a diagram illustrating an example image displayed on an electronic device generated by merging a plurality of images captured at a plurality of time points.

The electronic device may detect a first wireless communication device 911 and a second wireless communication device 912 located nearby. The electronic device may capture a first image 901 at a first time point based on a capturing signal received from the first wireless communication device 911 and capture a second image 902 at a second time point based on a capturing signal received from the second wireless communication device 912. The first image 901 and the second image 902 may be images showing a same space but captured at different time points.

The electronic device may extract, at the first time point, an object region 921 corresponding to a first user from the first image 901, based on a calculated location of each of the first wireless communication device 911 and the second wireless communication device 912. The electronic device may extract, at the second time point, an object region 922 corresponding to a second user from the second image 902, based on the calculated location of each of the first wireless communication device 911 and the second wireless communication device 912. The first user who is a user of the first wireless communication device 911 in a merged image 903 may be shown as the object region 921 corresponding to the first user in the first image 901, because the first image 901 is captured based on the capturing signal received from the first wireless communication device 911. In addition, the second user who is a user of the second wireless communication device 912 in the merged image 903 may be shown as the object region 922 corresponding to the second user in the second image 902, because the second image 902 is captured based on the capturing signal received from the second wireless communication device 912.

According to an example embodiment, the electronic device that generates the merged image 903 in which the first image 901 and the second image 902 are merged may set a boundary region 940 in the merged image 903. The boundary region 940 may be a region that is set based on information on the object region 921 corresponding to the first user in the first image 901 and information on the object region 922 corresponding to the second user in the second image 902. In the merged image 903, the boundary region 940 may be a region set to separate the object region corresponding to the first user and the object region corresponding to the second user from each other. In the merged image 903, points included in the boundary region 940 may be merged based on the first image 901 or the second image 902. With respect to one point included in the boundary region 940, the electronic device may identify a user close to the corresponding point. In an example embodiment, the electronic device may determine, in the merged image 903, whether the corresponding point is close to the object region corresponding to the first user or the object region corresponding to the second user. In an example embodiment, in response to a determination that the user close to the corresponding point is the first user, the corresponding point may be merged based on the first image 901 because, in the merged image 903, the object region 921 corresponding to the first user in the first image 901 is used as the information on the first user. In an alternative example, in response to a determination that the user close to the corresponding point is the second user, the corresponding point may be merged based on the second image 902 because, in the merged image 903, the object region 922 corresponding to the second user in the second image 902 is used as the information on the second user.

In an example embodiment, the boundary region 940 may not completely separate the object region corresponding to the first user and the object region corresponding to the second user from each other, and the merged image 903 may have a region in which the object region corresponding to the first user and the object region corresponding to the second user partially overlap. In this case, the electronic device may generate, in the merged image 903, the region in which the first user and the second user partially overlap based on the information on the object region 921 corresponding to the first user in the first image 901.

The electronic device may merge the first image 901 and the second image 902 based on the boundary region 940. In an example embodiment, in the merged image 903, one region 931 relative to the boundary region 940 may be generated based on the first image 901 including the object region 921 corresponding to the first user. In addition, in the merged image 903, another region 932 relative to the boundary region 940 may be generated based on the second image 902 including the object region 922 corresponding to the second user. The electronic device may store the generated merged image 903.

What is claimed is:

1. An electronic device, comprising:
   a camera module;
   a communication module comprising a communication processor configured to detect wireless communication devices, including a first wireless communication device and a second wireless communication device, located in a predetermined distance from the electronic device, and receives, from the detected wireless communication devices, an identification code set in each of the detected wireless communication devices; and
   a processor configured to receive a first user profile from the first wireless communication device and a second user profile from the second wireless communication device in response to identification codes of the first wireless communication device and the second wireless communication device, which are retrieved from a pre-stored tag database, and apply visual effects to an image captured by the camera module based on received user profiles,
   wherein
   the communication module is further configured to calculate locations of the wireless communication devices with respect to the electronic device, and
   the processor is further configured to:
   identify users in the captured image;

extract object regions corresponding to the identified users from the captured image through object segmentation;

identify a first user matched to the first wireless communication device and a second user matched to the second wireless communication device among the identified users by comparing locations of the extracted object regions with the calculated locations of the first wireless communication device and the second wireless communication device; and apply a first visual effect, based on the first user profile received from the first wireless communication device, to a first object region corresponding to the first user and a second visual effect, which is different from the second visual effect, based on the second user profile received from the second wireless communication device, to a second object region corresponding to the second user in the captured image.

2. The electronic device of claim 1, wherein the communication module is configured to establish communication with the wireless communication devices based on ultra-wideband communication.

3. The electronic device of claim 1, wherein the processor is further configured to convert the calculated location of the wireless communication devices, which is a three-dimensional location, into a two-dimensional location on image plane of the camera module based on a field of view of the camera module.

4. The electronic device of claim 1, wherein the processor is configured to keep the first object region and the second object region in the captured image, and masks, based on a user input, at least some of object regions corresponding to remaining users except a user matched to the wireless communication devices among users identified in the captured image.

5. The electronic device of claim 1, wherein the processor is configured to generate tag information by mapping the first object region to an identification code of the first wireless communication device, the second object region to an identification code of the second wireless communication device and stores the captured image combined with the generated tag information.

6. The electronic device of claim 5, wherein the processor is configured to extract, from images stored in the electronic device, an image having tag information comprising a candidate identification code obtained based on a user input of the electronic device, and applies a visual effect to an object region mapped to the received candidate identification code for the extracted image.

7. The electronic device of claim 1, wherein the camera module is configured to capture a first image at a first time point in response to a capturing signal received from the first wireless communication device, and captures a second image at a second time point, which is different from the first time point, in response to a capturing signal received from the second wireless communication device, and the processor is configured to merge the first captured image and the second captured image based on a calculated location of the wireless communication devices.

8. The electronic device of claim 7, wherein the processor is configured to merge the first captured image and the second captured image to generate a merged image based on the first object region corresponding to the first user extracted from the first captured image and a second object region corresponding to the second user extracted from the second captured image, wherein a boundary region is set to separate the first object region and the second object region from each other in the merged image, wherein the processor is further configured to determine, in the merged image, whether each of points in the boundary region is close to the first object region or the second object region, in response to a determination that an object region close to a first point in the boundary region is the first object region, merge the first point based on the first image, in response to a determination that an object region close to a second point is the second object region, merge the second point based on the second image.

9. A method performed by an electronic device, the method comprising:

detecting wireless communication devices, including a first wireless communication device and a second wireless communication device, located in a predetermined distance from the electronic device;

receiving, from the detected wireless communication devices, an identification code set in each of the detected wireless communication devices;

receiving, a first user profile from the first wireless communication device and a second user profile from the second wireless communication device in response to identification codes of the first wireless communication device and the second wireless communication device, which are retrieved from a pre-stored tag database; and applying visual effects to an image captured by a camera module of the electronic device based on received user profiles, wherein the method further comprises calculating locations of the wireless communication devices with respect to the electronic device, and wherein the applying visual effects to the captured image comprises identifying users in the captured image;

extracting object regions corresponding to the identified users from the captured image through object segmentation;

identifying a first user matched to the first wireless communication device and a second user matched to the second wireless communication device among the identified users by comparing locations of the extracted object regions with the calculated locations of the first wireless communication device and the second wireless communication device; and applying a first visual effect, based on the first user profile received from the first wireless communication device, to a first object region corresponding to the first user and a second visual effect, which is different from the second visual effect, based on the second user profile received from the second wireless communication device, to a second object region corresponding to the second user in the captured image.

10. The method of claim 9, wherein the detecting wireless communication devices comprises establishing communication with the wireless communication devices based on ultra-wideband communication.

11. The method of claim 9, wherein the applying the visual effect to the image captured by the camera module comprises:

converting the calculated location of the wireless communication devices, which is a three-dimensional location, into a two-dimensional location on image plane of the camera module based on a field of view of the camera module.

12. The method of claim 9, further comprising:

keeping the first object region and the second object region in the image captured by the camera module; and masking, based on a user input, at least some of object regions corresponding to remaining users except a user matched to the wireless communication devices among users identified in the image captured by the camera module.

13. The method of claim 9, further comprising:

generating tag information by mapping the first object region to an identification code of the first wireless communication device, the second object region to an identification code of the second wireless communication device; and storing the image captured by the camera module combined with the generated tag information.

14. The method of claim 13, wherein the storing the image captured by the camera module comprises extracting, from images stored in the electronic device, an image having tag information comprising a candidate identification code obtained based on a user input of the electronic device, and applying a visual effect to an object region mapped to the received candidate identification code for the image extracted from the images stored in the electronic device.

15. The method of claim 9, further comprising:

capturing a first image at a first time point in response to a capturing signal received from the first wireless communication device, and capturing a second image at a second time point, which is different from the first time point, in response to a capturing signal received from the second wireless communication device; and merging the first captured image and the second captured image based on a calculated location of the wireless communication devices.

16. A non-transitory computer-readable storage medium storing instructions that, when executed by a processor, cause the processor to perform the method of claim 9.

\* \* \* \* \*